United States Patent [19]

Gagliardo et al.

[11] Patent Number: 5,014,273

[45] Date of Patent: May 7, 1991

[54] BAD DATA ALGORITHM

[75] Inventors: Michael A. Gagliardo, Shrewsbury; Paul M. Goodwin, Worcester; Donald W. Smelser, Bolton, all of Mass.

[73] Assignee: Digital Equipment Corporation, Maynard, Mass.

[21] Appl. No.: 303,574

[22] Filed: Jan. 27, 1989

[51] Int. Cl.⁵ .............................................. G06F 11/10
[52] U.S. Cl. .................................. 371/37.7; 371/21.2; 371/40.1
[58] Field of Search ...................... 371/37.1, 37.3, 37.7, 371/40.3, 40.2, 40.1, 13, 21.6, 21.2, 21.3, 21.1; 365/200, 201

[56] References Cited

U.S. PATENT DOCUMENTS

| | | | |
|---|---|---|---|
| 3,906,200 | 9/1975 | Petschauer | 371/21.6 X |
| 4,077,028 | 2/1978 | Lui et al. | 340/146.1 AL |
| 4,319,357 | 3/1982 | Bossen | 371/38 |
| 4,458,349 | 7/1984 | Aichelmann, Jr. et al. | 371/13 |
| 4,604,751 | 8/1986 | Aichelmann | 371/21.6 |
| 4,661,955 | 4/1987 | Arlington et al. | 371/38 |
| 4,698,810 | 10/1987 | Fukuda | 371/37.7 |
| 4,712,216 | 12/1987 | Glaise | 371/38 |
| 4,713,816 | 12/1987 | Van Gils | 371/38 |
| 4,782,487 | 11/1988 | Smelser | 371/21.6 |
| 4,817,095 | 3/1989 | Smelser | 371/13 X |

Primary Examiner—Jerry Smith
Assistant Examiner—Robert W. Beausoliel
Attorney, Agent, or Firm—Neuman, Williams, Anderson & Olson

[57] ABSTRACT

An algorithm, and methodology for its application, useful in digital computer systems incorporating read-modify-write data storage systems to accurately identify rewritten data which has been determined bad before being rewritten.

14 Claims, 3 Drawing Sheets

BAD DATA ALGORITHM

FIELD OF THE INVENTION

The present invention relates to bad data identification procedures for digital computer systems, and more particularly to an algorithm for ensuring that known bad data rewritten and stored in memory can be identified as bad even if an additional single bit error occurs.

BACKGROUND OF THE INVENTION

For read-modify-write data storage systems in digital computers, it is desirable to include a provision for preventing data discovered as bad and uncorrectable during the read process from being rewritten and later read as being correctable data. Such an occurrence is generally the result of the rewritten bad data inadvertently acquiring an additional bit error, which then make certain single bit errors occurring in the stored bad data look like correctable data when reread. The algorithms generally in use for this purpose do not protect the stored bad data from all cases of such single bit error influence.

SUMMARY OF THE INVENTION

The present invention assures proper identification of stored data already determined to be bad, after such bad data is rewritten as part of a read-modify-write operation. The complete data word comprises 40 bits with 7 check bits for error correction combined with a special mark bit and 32 bits of data. After read data is determined to be uncorrectably bad, 7 check bits are rated according to the error correction code (ECC) employed, and then the check bits are inverted. A special mark bit is also added to the data bits and inverted check bits. The data bits, inverted check bits and mark bit are then rewritten. When the bad data is reread, a new set of 7 check bits are generated, and the new check bits are compared to the 7 inverted check bits in an exclusive OR relationship, which when correlated with the special mark bit, provides an accurate indication that the condition of the rewritten data is bad, even if an additional single bit error occurs during the rewrite or read process.

DETAILED DESCRIPTION OF THE PREFERRED EMBODIMENT

Figure 1:
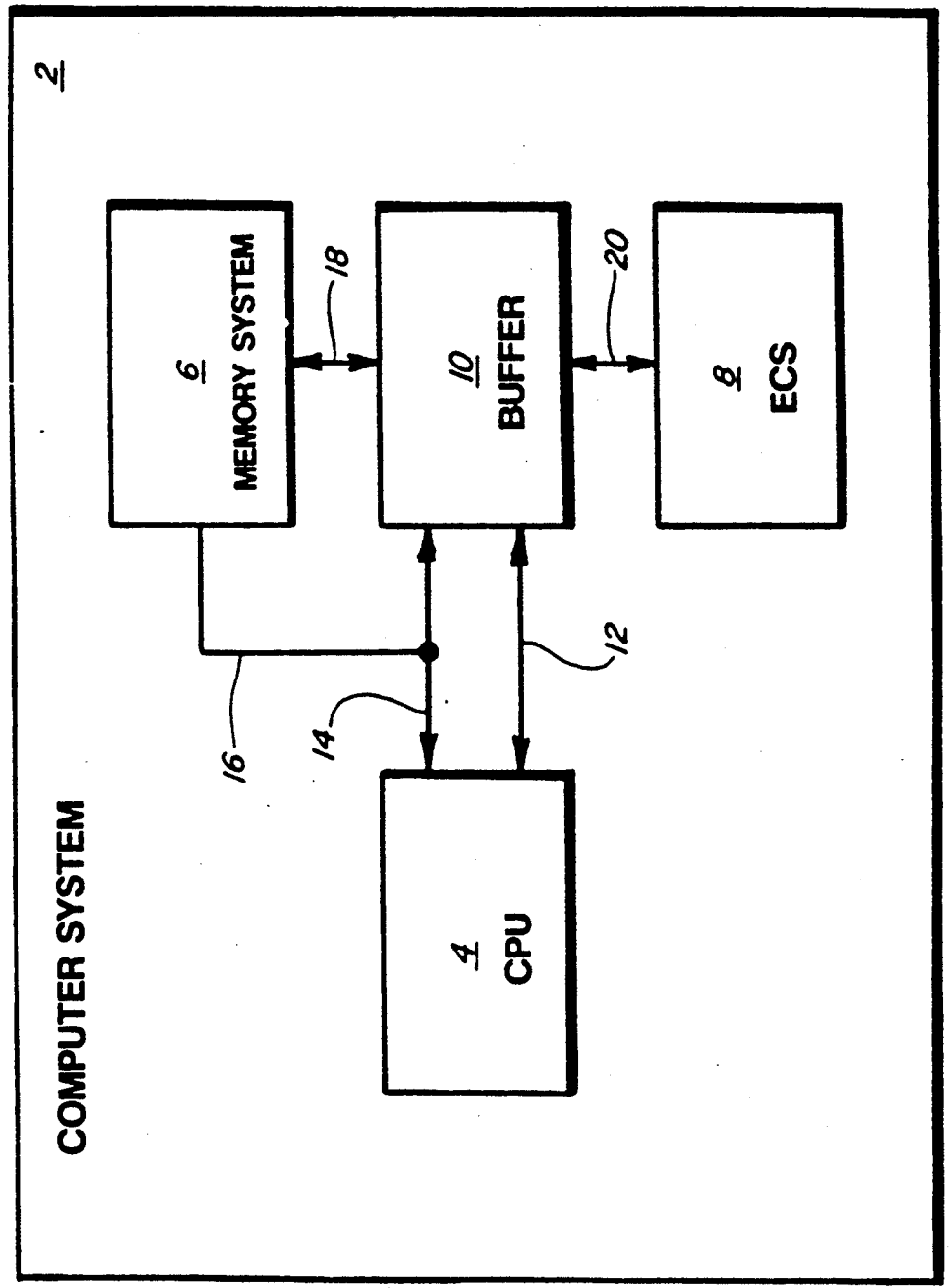
FIG. 1 is a typical digital computer system including a read-modify-write memory system suitable for incorporating the present invention.

Referring to the drawings, wherein like characters designate like or corresponding parts throughout the views, FIG. 1 illustrates schematically a typical digital computer system 2 suitable for incorporating the present invention. The computer system 2 includes a central processing unit (CPU) 4, a memory system 6, an error correcting system (ECS) 8 and a buffer 10. System data is transmitted between the CPU 4 and the buffer 10 via a computer data bus 12. Address information is sent from the CPU 4 to the buffer 10 via an address bus 14. Likewise, address information is sent from the CPU 4 to the memory system 6 via an address bus 16. Communication between the buffer 10 and the memory system 6 is provided by a communication data bus 18. Likewise, communication between the buffer 10 and the error correcting system (ECS) 8 is provided by a communication data bus 20. Each of the above are well known components which may be interconnected in a variety of well known configurations and are shown in block form for purposes of representation only, since they do not in themselves constitute part of the present invention. The memory system 6 may, for example, store 40 bit wide data words which include 32 data bit positions. The buffer 10 may, for example, be a multiple data word buffer including a plurality of 40 bit addressable word buffers. Data is transferred from the CPU 4 to the buffer 10 and then to the memory 6. Likewise, data read from the memory 6 is transferred to the buffer 10 and then to the CPU 4.

When provisions are made for 40 bit data words each having 32 data bit positions, 8 bits are available for the error detection and correction process. The 8 bits may be employed in the ECS 8 to automatically correct a single-bit error in any one of the data bit positions of each word read from the memory system 6. The ECS 8 may use any, or all, of the available bit positions for the error detection and correction process to allocate check bits for error correction purposes, the check bits being generated with the data of each data word according to any of the well known ECC codes. The check bits so allocated may then be employed to generate an ECC syndrome for error detection and correction using methods well known in the art. However, multiple errors detected in the data word during the ECC detection process, or data received from the CPU 4 for modifying the data word in which a parity error is discovered, cannot be corrected, and the data word must be designated as bad data when it is rewritten in the memory system 6.

Figure 2:
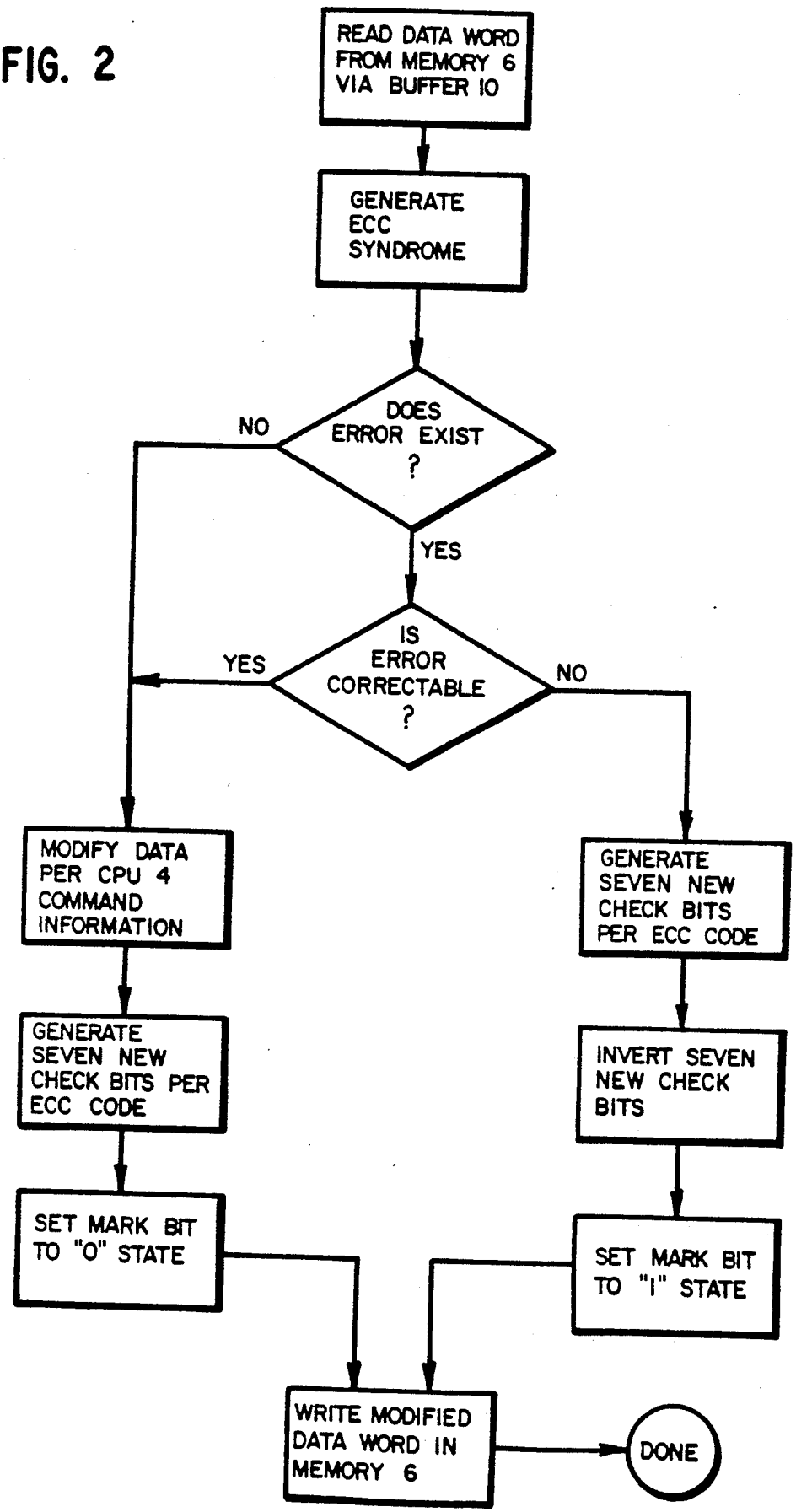
FIG. 2 is a flow chart of the basic methodology of the present invention applied to the read-modify-write memory system used in the digital computer system shown in FIG. 1.

When data words are read from the memory system 6 as part of a read-modify-write process in response to command information from the CPU 4, the implementation of a bad data algorithm according to the present invention follows the flow chart shown in FIG. 2. After the data word is read from the memory system 6 and new data is received with command information from the CPU 4 via the buffer 10, the data word from the memory system 6 and the new data from the CPU 4 are checked for errors. If no error is found in the data word from the memory 6 or in the new data from the CPU 4, then the read data is modified by the new data in accord with the command information from CPU 4, a new set of 7 check bits according to the ECC code used is generated and the mark bit is set to the "0" state. The mark bit position is used to designate the status of the data, the mark bit being set to a "1" state for bad data, and a "0" state for good data. The entire 40 bit data word including the 32 data bits modified with new data according to the command information from the CPU 4 the new 7 check bits and the "0" state mark bit is rewritten into the memory system 6.

If error is found, but it is correctable, such as is the case if a single bit error is found in the read data word from the memory 6, the process continues the same as if no error was detected as described above, the modified data word being rewritten with 7 new check bits and a "0" state mark bit. If error is found which is uncorrectable, the data word from the memory 6 is not modified by the new data from the CPU 4 in accord with the command information, but seven new check bits are generated just as described above for data with no detected error, the check bits are then inverted, and the mark bit is set to the "1" state. The 40 bit data word including the unmodified 32 data bits, the inverted check bits and a "1" state mark bit is then rewritten into the memory system 6.

The data portion of data words designated bad data with the mark bit set in the "1" state are rewritten as read, in non-inverted form, because the detected error in such bad data may have been caused by a faulty dynamic random access memory (DRAM) chip in the memory system 6 that will always produce the same state. By writing back the same state to that faulty DRAM, rereading of the data as written is ensured. Otherwise, an additional single bit error might be read during the rereading process, which could cause the ECS 8 to erroneously identify the data word as having a correctable error when the data word has actually already been identified as bad data.

The method or process for detecting the bad data tibit error in one situation. Therefore, reliance cannot be placed only on the complimentary syndrome to determine that a read data word contains uncorrectable errors and the mark bit must be used.

The one situation referred to in the preceding paragraph occurs when the initial bad data detected in the read data word from the memory system 6 contains one error in a data bit position and another in a check bit position and this bad data is rewritten into the memory system 6 with inverted check bits and the mark bit set to the "1" state as described above and then when this data is read an additional single bit error occurs in one of the bad data bit positions. This exception occurs because such bad data when reread can generate an ECC syndrome of 3, 4 or 5 "1"'s. A syndrome of 3 "1"'s indicates a single bit error. A single bit error is normally correctable. However, the correlation of the mark bit with the generated ECC syndrome in the decoding logic allows the reread data word to be correctly determined to have bad, uncorrectable data, since the mark bit is set to the "1" state for bad data and the "0" state for good data.

The Table indicates all possibilities of error detected in read and reread data words initially read as having bad data.

TABLE

0 ==> NO ERROR  
1 ==> 1 ERROR  
2 ==> 2 ERRORS  
u ==> "1"or "0"  
MBE ==> multiple bit error

| PREVIOUS ERRORS | | | NEW ERROR | | | | READ | REPORTED |
|---|---|---|---|---|---|---|---|---|
| MARK | DATA | CB | MARK | DATA | CB | SYNDROME | MARK | ERROR |
| 0 | 2 | 0 | 0 | 0 | 0 | 7 "1"'s | "1" | MBE |
| 0 | 2 | 0 | 0 | 1 | 0 | 4 "1"'s | "1" | MBE |
| 0 | 2 | 0 | 0 | 0 | 1 | 6 "1"'s | "1" | MBE |
| 0 | 2 | 0 | 1 | 0 | 0 | 7 "1"'s | "0" | MBE |
| 0 | 0 | 2 | 0 | 0 | 0 | 7 "1"'s | "1" | MBE |
| 0 | 0 | 2 | 0 | 1 | 0 | 4 "1"'s | "1" | MBE |
| 0 | 0 | 2 | 0 | 0 | 1 | 6 "1"'s | "1" | MBE |
| 0 | 0 | 2 | 1 | 0 | 0 | 7 "1"'s | "0" | MBE |
| 0 | 1 | 1 | 0 | 0 | 0 | 6,7 "1"'s | "1" | MBE |
| 0 | 1 | 1 | 0 | 1 | 0 | 3,4,5, "1"'s | "1" | MBE(1) |
| 0 | 1 | 1 | 0 | 0 | 1 | 5,6,7 "1"'s | "1" | MBE |
| 0 | 1 | 1 | 1 | 0 | 0 | 6,7 "1"'s | "0" | MBE |
| 1 | 2 | 0 | 0 | 0 | 0 | 7 "1"'s | u | MBE |
| 1 | 2 | 0 | 0 | 1 | 0 | 4 "1"'s | u | MBE |
| 1 | 2 | 0 | 0 | 0 | 1 | 6 "1"'s | u | MBE |
| 1 | 2 | 0 | 1 | 0 | 0 | 7 "1"'s | u | MBE |
| 1 | 0 | 2 | 0 | 0 | 0 | 7 "1"'s | u | MBE |
| 1 | 0 | 2 | 0 | 1 | 0 | 4 "1"'s | u | MBE |
| 1 | 0 | 2 | 0 | 0 | 1 | 6 "1"'s | u | MBE |
| 1 | 0 | 2 | 1 | 0 | 0 | 7 "1"'s | u | MBE |
| 1 | 1 | 1 | 0 | 0 | 0 | 6,7 "1"'s | u | MBE |
| 1 | 1 | 1 | 0 | 1 | 0 | 3,4,5 "1"'s | u | SBE/MBE(2) |
| 1 | 1 | 1 | 0 | 0 | 1 | 5,6,7 "1"'s | u | MBE |
| 1 | 1 | 1 | 1 | 0 | 0 | 6,7 "1"'s | u | MBE |

Figure 3:
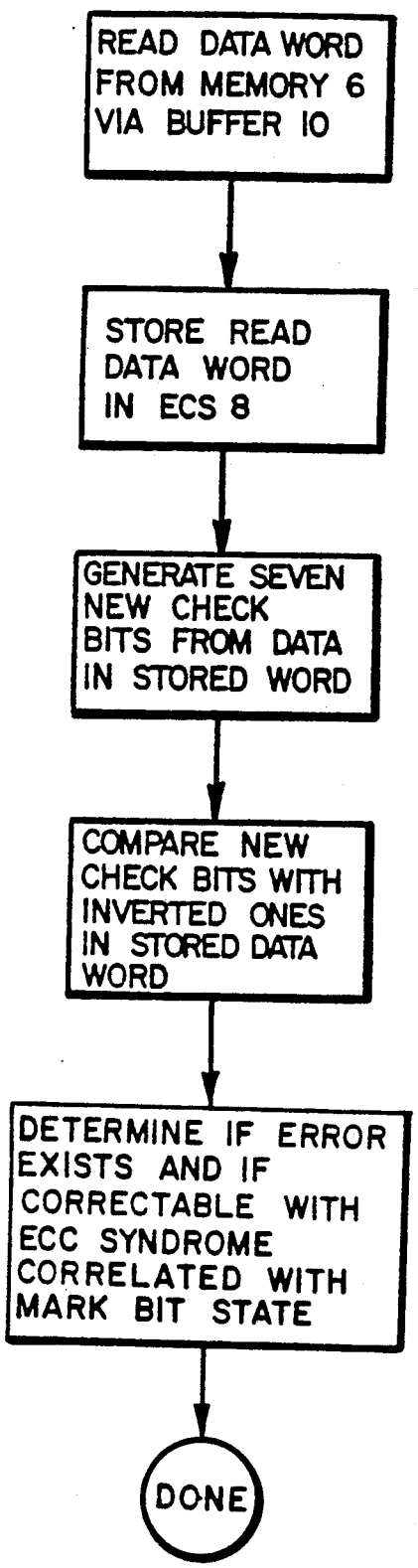
FIG. 3 is a flow chart of the specific methodology for developing the algorithm used in the present invention shown in FIG. 2.

(1) 3 "1"'s normally detected as a SBE but the mark bit distinguishes it as a MBE.
(2) if the syndrome is 3 "1"'s and the mark bit is 0 this will be reported incorrectly as a SBE.

algorithm according to the present invention to correctly identify rewritten data detected and designated as bad follows the flow chart shown in FIG. 3. The data word read form the memory system 6 is stored in the ECS 8 and 7 new check bits are generated from the stored data according to the ECC code. The new check bits are then compared to the inverted check bits which form part of the stored data word in an exclusive OR relationship. The inverted stored check bits produce an ECC syndrome which is a compliment of the syndrome that would normally be generated by a single bit error. The complimentary syndrome generated with the inverted stored check bits indicates uncorrectable multiple bit error more accurately than the normally generated syndrome. The complimentary syndrome will not accurately identify data words with uncorrectable mul- Thus, there has been described herein a bad data identification algorithm uniquely suited for read-modify-write memory storage systems in digital computers which can identify all single bit errors that occur on data marked bad and report them as uncorrectable multiple bit errors, while distinguishing single bit errors on good data. It will be understood that various changes in the details, arrangements and configurations of the parts and assemblies which have been described and illustrated above in order to explain the nature of the present invention may be made by those skilled in the art within the principle and scope of the present invention as expressed in the appended claims.

What is claimed is:

1. For a digital computer system including a memory system with a read-modify-write operation mode having a plurality of stored data words, each stored data word having a plurality of data bit positions and a plurality of error correction code (ECC) bit positions, a method of identifying data words as bad data words which have uncorrectable errors, including the steps of:

allocating a bit of said ECC bit positions in each of said data words to indicate that said data has been determined uncorrectable;

generating a mark bit for each of said data words in said allocated bit position;

generating check bits for each of said data words according to an error correction code (ECC) to fill the remainder of said ECC bit positions;

inverting said generated check bits for each of said bad data words to form a plurality of corresponding inverted check bits;

writing said data for each of said data words into its corresponding data bit positions;

writing said inverted check bits for each of said bad data words into their corresponding ECC bit positions;

writing said mark bit for each of said data words into said allocated bit position;

reading each of said written data words;

generating new check bits for each of said read data words according to said ECC;

comparing said read data generated check bits with said corresponding written check bits in an exclusive OR relationship to develop an ECC syndrome; and correlating said ECC syndrome with said mark bit in each of said read data words to identify that each of said bad data words contain uncorrectable errors.

2. The method recited in claim 1, wherein said step of generating said mark bit includes generating said mark bit as a logical "1" state for each of said data words that include bad data.

3. The method recited in claim 2, wherein said data words comprise 40 bit data words.

4. The method recited in claim 2, wherein said data bit positions of each said data word comprise 32 data bit positions.

5. The method recited in claim 4, wherein said step of generating check bits includes generating 7 check bits for each of said data words.

6. The method recited in claim 2, wherein said data words include good data words with good data and said step of generating said mark bit further includes generating said mark bit as a logical "0" state for each said good data word having good data.

7. The method recited in claim 6 further including the steps of:

writing said good data for each of said good data words into its corresponding data bit positions; and writing said check bits for each of said good data words into their corresponding ECC bit positions.

8. The method recited in claim 7, wherein said data words comprise 40 bit data words.

9. The method recited in claim 8, wherein said data bit positions of each data word comprise 32 data bit positions.

10. The method recited in claim 9, wherein said step of generating check bits includes generating 7 check bits for each of said data words.

11. For a digital computer system including a memory system with a read-modify-write operation mode having a plurality of good and bad stored data words, each stored data word having a plurality of data bit positions and a plurality of error correction code (ECC) bit positions, a method of identifying data words as bad data words which have uncorrectable errors, including the steps of:

allocating a bit of said ECC bit positions in each of said data words to indicate that said data has been determined uncorrectable;

generating a logical "0" mark bit for each of said good data words in said allocated bit position;

generating a logical "1" mark bit for each of said bad data words in said allocated bit position;

generating check bits for each of said data words according to an error correction code (ECC) to fill the remainder of said ECC bit positions;

inverting said generated check bits for each of said bad data words to form a plurality of corresponding inverted check bits;

writing said data for each of said data words into its corresponding data bit positions;

writing said check bits for each of said good data words into their corresponding ECC bit positions;

writing said inverted check bits for each of said bad data words into their corresponding ECC bit positions;

writing said mark bit for each of said data words into said allocated bit position;

reading each of said written data words;

generating new check bits for each of said read data words according to said ECC;

comparing said read data generated check bits with said corresponding written check bits in an exclusive OR relationship to develop an ECC syndrome; and correlating said ECC syndrome with said mark bit in each of said read data words to identify that each of said bad data words contain uncorrectable errors.

12. The method recited in claim 11, wherein said data words comprise 40 bit data words.

13. The method recited in claim 12, wherein said data bit positions of each said data word comprise 32 data bit positions.

14. The method recited in claim 13, wherein said step of generating check bits includes generating 7 check bits for each of said data words.

* * * * *